United States Patent Office

Re. 28,212
Reissued Oct. 29, 1974

28,212

POLYAMIDES CONTAINING ANTISTATIC POLYOLEFINS HAVING PENDANT POLYOXYALKYLENE CHAINS

Pierre Grosjean, Ste.-Foy-les-Lyon, France, assignor to Societe Rhodiaceta, Paris, France No Drawing. Original No. 3,641,198, dated Feb. 8, 1972, Ser. No. 64,600, Aug. 17, 1970. Application for reissue June 7, 1973, Ser. No. 367,958
Claims priority, application France, Aug. 22, 1969, 6928876
Int. Cl. C08g *41/04*
U.S. Cl. 260—857 PG 5 Claims

Matter enclosed in heavy brackets [ ] appears in the original patent but forms no part of this reissue specification; matter printed in italics indicates the additions made by reissue.

ABSTRACT OF THE DISCLOSURE

An antistatic composition and a shaped article produced therefrom in the form of yarns, fabric, knitted fabric, etc., comprising a base thermoplastic synthetic polymer selected from polyamides and polyesters containing dispersed therein a polyolefin having an average molecular weight of greater than 1000 in an amount of about 1 to about 10 percent by weight, said polyolefin comprising a polymer with the recurring structural unit of the formula:

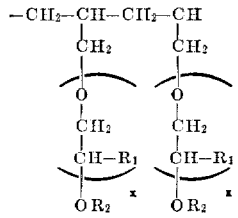

wherein $R_1$ is selected from hydrogen and methyl; $R_2$ is selected from hydrogen, alkyl or aryl; and $x$ is an integer of 1 to 600.

The present invention relates to an antistatic and soil-resistant composition having as a base a synthetic polymer, e.g., a polyamide or polyester; more particularly, the present invention relates to such an antistatic and soil-resistant composition and shaped articles produced therefrom wherein such antistatic characteristics are associated with the incorporation of a minor amount of a polyolefin containing pendant antistatic groupings.

It has been known for a long period of time that synthetic polymers, while possessing excellent mechanical and chemical properties making them particularly suited for a number of applications, such synthetic polymers also have a strong tendency to acquire an electrostatic charge through friction. Such tendency to develop an electrostatic charge brings about many practical difficulties and disadvantages both with regard to the production and use of shaped articles prepared from such synthetic polymers. This is particularly true in textile applications such as in the production and use of woven or knitted clothing, carpeting, etc. Accordingly, while such synthetic polymers have a number of advantages, the same have not been particularly applicable for certain applications due to the disadvantageous accumulation of electrostatic charges.

In order to overcome the foregoing disadvantages, it has been previously proposed to superficially treat the surface of the shaped articles produced from the synthetic polymers by coating the shaped articles with a material for the purpose of reducing the accumulation of static electricity. While such surface treatment does eliminate the electrostatic charge built up for a short period of time, such surface treatment is not in and of itself the answer to the foregoing problem since the treatment is temporary at best since the coating tends to become worn off or washed off of the surface of the article. Where such a surface treatment is made permanent as by making the coating insoluble on the fiber or similar article, the shaped articles having such coatings are disadvantageous in that the permanent surface coating eliminates some of the advantageous physical characteristics of the synthetic polymer while giving the fiber or similar shaped article a rather unpleasant rough feel. Accordingly, the use of such surface coatings has not supplied the answer nor has the same eliminated the disadvantages associated with the build-up of electrostatic charges in synthetic polymers.

Various other attempts to improve the antistatic properties of synthetic polymers have involved, for example, the preparation of antistatic compositions from copolymers prepared from absorbent monomers and hydrophobic monomers so as to nullify the effects of the build-up of electrostatic charges. While such production of copolymers does eliminate the electrostatic charge build-up to some extent, it is usually accompanied by a reduction in the physical properties of the composition, e.g., the tenacity or elongation, etc. of the filament or similar shaped article is drastically reduced when compared with the same properties of the hydrophobic homopolymers. Accordingly, the production of such copolymers has not proved entirely satisfactory and has not provided a complete answer to the antistatic build-up of synthetic polymers.

It has similarly been known prior to the present invention to prepare antistatic compositions by incorporating into synthetic polymers such as polyamides or polyesters, either before or after polycondensation, alkylene polyethers dispersed in the product in a minor amount. Since these linear polyethers are partially soluble in water, however, they are progressively eliminated during the course of successive domestic washings. Accordingly, while the preparation of antistatic compositions containing the alkylene polyethers does in fact reduce the tendency for the polymer to build up electrostatic charges for a period of time, such answer to the basic problem is unsatisfactory when considering filaments and fibers for textiles, including clothing and rugs, which are normally subjected to many washings during use. Accordingly, notwithstanding the foregoing attempts to eliminate the static electricity build-up of synthetic polymers, no completely satisfactory answer has been developed until the development of the present invention.

The foregoing disadvantages and deficiencies of previous developed synthetic polymer compositions have been overcome in accordance with the present invention, whereby applicant has developed a thermoplastic synthetic polymer composition and a shaped article therefrom, e.g., a fiber or filament, etc., wherein such composition is based upon a polyester or polyamide containing dispersed therein a polyolefin having an average molecular weight of greater than 1000, such polyolefin having antistatic groupings pendant thereto. By incorporating such polyolefin in the thermoplastic synthetic polymer composition in an amount of from about 1 to about 10 percent by weight, the foregoing disadvantages with regard to electrostatic charge build-up are overcome and the physical characteristics of the polymer are in no way impaired.

Accordingly, it is a principal object of the present invention to provide a novel antistatic synthetic thermoplastic resin composition and shaped articles produced therefrom, e.g., fibers, filaments, films, etc., which composition and shaped articles have eliminated the inherent deficiencies and disadvantages of previously described antistatic compositions.

It is a further object of the present invention to produce such antistatic compositions based upon a polyester or polyamide wherein such polyester or polyamide has incorporated therein a minor amount a polyolefin having an average molecular weight of greater than 1000 and containing pendant antistatic groupings.

A still further object of the present invention comprises shaped articles produced from the foregoing composition wherein such shaped articles in the form of fibers, filaments, film, etc. have a reduced tendency to accumulate these electrostatic charges while maintaining the advantageous physical characteristics of the base polyester or polyamide, such articles being prepared from a composition containing from about 1 to about 10 percent by weight of a polyolefin dispersed in a polyester or polyamide, the polyolefin having an average molecular weight of greater than 1000 and pendant antistatic groupings.

Still further objects and advantages of the novel composition and articles of the present invention will become more apparent from the following more detailed description thereof.

The foregoing objects and advantages of the present invention are provided by a thermoplastic synthetic polymer composition and shaped articles produced therefrom in the form of fibers, filaments, films, etc., such compositions being based upon a polyamide or a polyester and containing dispersed therein a polyolefin having an average molecular weight of greater than 1000 and having pendant antistatic groupings laterally attached thereto. It has been discovered in accordance with the present invention that by providing such a thermoplastic synthetic polymer composition with a polyolefin finely and evenly dispersed therein, the antistatic properties of the base polyamide or polyester are substantially improved while the other advantageous physical properties of the base polymer are not in any way impaired.

The polyolefin which is finely and evenly dispersed in the synthetic polymer composition is generally a material having a molecular weight of greater than 1000, the same being formed essentially of a linear hydrocarbon chain with lateral antistatic groupings pendant thereto. Accordingly, such polyolefin is one which consists essentially of the recurring structural unit of the formula:

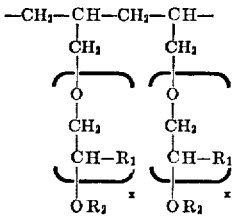

wherein $R_1$ is selected from hydrogen and methyl; $R_2$ is selected from hydrogen, alkyl and aryl; and x is an integer of 1 to 600.

Accordingly, suitable $R_2$ groups include such as methyl, ethyl, isopropyl, n-propyl, n-butyl, isobutyl, n-hexyl, n-octyl, oxo-octyl, decyl, dodecyl, hexadecyl, stearyl, eicosyl, phenyl, butylphenyl, hexylphenyl, octylphenyl, nonylphenyl, etc.

The incorporation of such polyolefin into a polyester or polyamide composition has certain distinct advantages when compared, for example, with other polymer additives that have been heretofore utilized to produce antistatic properties in a synthetic polymer composition. Thus, for example, because of their low water solubility, the polyolefins form emulsions in water and are therefore not easily removed from the shaped articles by washing and, in fact, the polyolefins can be removed from the products only with extreme difficulty. This therefore produces a permanence in the antistatic effect in a manner not heretofore possible with previous antistatic compositions.

A further advantage results from the fact that the polyolefins that are employed in accordance with the present invention are produced through the polymerization of allyl compounds which do not polymerize uniformly. This therefore results in a polyolefinic mass which is composed of products having a high molecular weight, products having a low molecular weight, and a certain ratio of unreacted monomers. Such diversity in the molecular weight and composition of the product is not in any way disadvantageous in accordance with the present invention in that such diversity establishes further interesting properties with regard to the utilization of the polyolefin as an additive to improve the antistatic and anti-soil properties of polyamides and polyesters. Thus, for example, when incorporating the polyolefin product into a polyamide or polyester, any monomer which remains is more or less rapidly eliminated, depending upon its molecular weight and structure. The low molecular weight polymers are susceptible to slow migration to the surface while the high molecular weight polymers impart permanent improvement in the properties of the shaped articles. Accordingly, by introducing the polymerizaiton product into the polyamide or polyester article both immediate and prolonged improvement in the antistatic and anti-soiling properties of the composition are realized. Again, it is pointed out that the polyolefin which is incorporated in accordance with the present invention is one which has an average molecular weight of greater than 1000. Thus such polyolefins employed in accordance with the present invention have a hydrophilic or absorbent characteristic which is much higher than most of the antistatic polymers heretofore known and heretofore employed to produce antistatic synthetic polymer compositions.

It is well known that the hydrophilic character of polymers prepared from alkylene oxides increases with the number of hydroxyl groups present in the polymer but that this number decreases when the molecular weight of the polymer increases. The polyolefins which are employed in accordance with the present invention as an additive for the polyamide or polyester composition can have a great number of lateral chains ending with the hydroxyl group. Accordingly, the relative number of hydroxyl groups in the polymer is independent of the molecular weight of the polymer in that the groups are attached to pendant side chains. Accordingly, the polymer additives employed in accordance with the present invention simultaneously have a high molecular weight and a satisfactory water pick-up rate. This makes them eminently suitable for use in the antistatic compositions of the present invention to impart the antistatic characteristics to polyamides and polyesters while not in any way interfering with the other essential and advantageous characteristics of the base polymer.

The polyolefins that are employed in accordance with the antistatic characteristics to polyamides and polyesters of an allyl monomer or monomers having one or more polyoxyalkylene chains with hydroxyl or ether terminal groups. Accordingly, the monomer which can be employed in the production of the polyolefin utilized in accordance with the present invention generally correspond to the formula:

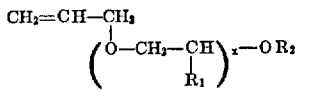

wherein $R_1$, $R_2$, and x have the meanings previously ascribed.

Generally, in preparing the polyolefin component in accordance with the present invention, the monomer system comprises one or more of the foregoing allyl monomers corresponding to the above formula in an amount of at least 75 percent by weight with up to about 25 percent by weight of a comonomer having the formula:

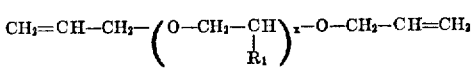

wherein $R_1$ and x have the same meanings as set forth above.

The basic allyl monomers which are employed in the production of the polyolefin component utilized in accordance with the present invention are obtained in their usual manner, either through the condensation of allyl chloride with a monoalcohol in the form of its alcoholate or through the oxyethylation of an allyl alcohol. In this regard, such allyl monomers which are polymerized in accordance with the present invention to produce the polyolefin component are well known in the art and can be easily prepared by well-known prior art procedures.

Similarly, while the above formula represents an ethylene oxide or propylene oxide chain in the polyether portion of the polyolefin, it should be recognized that the polyether chain may comprise copolymers derived both from ethylene oxide and propylene oxide. Here again, the method of producing such copolymers is well-known in the art and any prior art procedure can be utilized in the production of the materials useful in accordance with the present invention.

While the polyolefin components in accordance with the present invention generally comprise a homopolymer or copolymer of one or more of the foregoing allyl monomers, it is of course obvious that other comonmers can be employed in a minor amount, i.e., up to about 20 percent by weight based upon the weight of the polyolefin. Thus, for example, other comonomers which can be copolymerized with the allyl monomers include such materials as styrene, sodium vinyl-sulfonate, methyl-5-vinyl-2-pyridine, and N-vinyl pyrrolidone. In addition, other comonomers which do not in any way adversely affect the antistatic characteristics of the polyolefin can be advantageously copolymerized in accordance with the present invention.

The polyolefin component which is employed in accordance with the present invention is uniformly dispersed in the polyamide or polyester and is generally present in the form of inclusions having an average diameter of between about 1 and about 10 microns. In addition, as indicated previously, such polyolefin component in accordance with the present invention is finely and evenly dispersed in the polyamide or polyester composition in an amount of from about 1 to about 10 percent by weight, preferably from about 2 to about 5 percent by weight. Accordingly, since the proportion of the polyolefin component necessary to obtain a composition having excellent antistatic properties does not exceed about 10 percent by weight, the softening point of the final preparation and its behavior in a melted condition are very close to the softening point and behavior of the basic polymer, i.e., polyamides and polyesters. This, therefore, is a distinct advantage of the novel composition and shaped articles of the present invention when compared to conventional antistatic compositions.

As indicated previously, the polyolefins of the present invention are incorporated in a polyester or polyamide in order to improve the antistatic characteristics thereof while not in any way adversely affecting other physical characteristics of the base polymer. The polyamides within which the polyolefins can be incorporated can be any of the linear super-polyamides well-known for the production of fibers, films, and other shaped articles. Thus, for example, the polyamides employed in accordance with the present invention can comprise any of the long-chain polyamides having a recurring amide group as an integral part of the main polymer chain. Such polyamides, for example, are commercially known as nylon 66, i.e., a polyamide produced by condensing hexamethylene diamine and adipic acid; nylon 610, prepared by condensing hexamethylene diamine with sebacic acid; nylon 8, a polyamide based upon capryllactam; nylon 9, a polyamide based on 9-aminononanoic acid; nylon 12, a polyamide produced by the polymerization of lauric lactam or cyclododecalactam; and nylon 6, a polyamide produced by the polycondensation of caprolactam. Of course, in addition to the foregoing polyamides, copolyamides of one or more of the above types can be advantageously carried out in accordance with the present invention. Here again, the present invention is applicable to any long-chain polyamide having a recurring amide group as an integral part of the main polymer chain.

Similarly, the polyesters which can be employed in accordance with the present invention comprise any of the linear high molecular weight thermoplastics having a saturated polyester backbone. Such polyesters are prepared by condensing (1) a glycol such as ethylene, propylene, diethylene, dipropylene or butylene glycol; and (2) terephthalic or isophthalic acid, eventually in mixture with an acid or anhydride such as adipic acid, azelaic acid. Such materials are typified, for example, by polyethylene terephthalate, made by condensing ethyleene glycol and terephthalic acid and particularly suited for the production of fibers and films. Such material is known under the trade names "Terphane" "Mylar" and "Tergal" "Dacron." In addition to the foregoing polyesters and polyamides, it is of course obvious that copolyesters and polyesteramides, e.g., polyterephthalamides, can be advantageously utilized in accordance with the present invention. Here again, the present invention is not directed to any specific base polymers and any conventional polyester or polyamide can have its antistatic properties improved in accordance with the present invention.

The incorporation of the polyolefin in the polyester or polyamide composition in accordance with the present invention can be effected in a number of different manners. Thus, for example, the polyolefin can be prepared in situ by polymerizing the allyl monomer in the polycondensation reaction in which the base polyester or polyamide is formed. Thus, for example, the allyl monomer or comonomers can be added to the polyester or polyamide monomer systems so as to simultaneously polymerize and polycondense the monomers present. In this way, the polyolefin can be incorporated in the system without in any way altering the basic poly-condensation reaction.

Alternatively, the polyolefin can be first prepared by polymerizing the monomer or monomers and thereafter introducing the polyolefin into the base polymer composition during the polycondensation reaction. As a still further alternative, however, the polyolefin can be first prepared by polymerization of the monomer or monomers and the preformed polyolefin can be incorporated into a preformed base polyamide or polyester in a suitable melting device or mixer. Regardless of the manner of incorporation of the polyolefin into the polyester or polyamide composition, the polyolefin is present in the form of inclusions, the diameter of which is between approximately 1 and 10 microns. In addition, it is again pointed out that the antistatic properties and antisoiling properties of the composition are miproved by including an amount of polyolefin not exceeding about 10 percent by weight, based upon the weight of the total composition. Accordingly, the properties of the composition can be improved with a minor amount of polyolefin and the addition of the polyolefin component does not in any way adversely affect the other advantageous characteristics of the polyamide or polyester.

Under certain circumstances, where the polyolefin is prepared in situ during simultaneous polymerization and polycondensation of the base polyester or polyamide, it is sometimes advantageous to add to the reaction system a free radical polymerization catalyst such as, for example, organic peroxides redox systems, and other conventional catalysts such as azodi-isobutyro-nitrile. Such catalysts merely aid in the polymerization of the allyl monomer or monomers so as to facilitate preparation of the polyolefin during polycondensation. Similarly, while the simultaneous polymerization and polycondensation can normally be conducted under the same conditions as the polycondensation reaction itself, it is often possible to modify the usual conditions of temperature, pressure or duration of one of the phases of the operation, particularly when a portion of the olefinic monomer might be eliminated, for example, by water. In general, however, the normal conditions for the polycondensation reaction in the production of the base polyester or polyamide need not be deviated from.

The novel composition and articles of the present invention will now be illustrated by reference to the following specific examples. It is to be understood that such examples are presented for purposes of illustration only, and the present invention is in no way to be deemed as limited thereto.

EXAMPLE 1

A stainless steel, 7.5 liter autoclave, previously cleansed by a flow of nitrogen was loaded with 5,240 g. of an aqueous solution of hexamethylene diammonium adipate, the concentration of which was 50% by weight, 4.5 g. of pure acetic acid, as a viscosity stabilizer for the polyamide, and 113 g. (i.e., 5% by weight with respect to the polyamide) of a monomer olefin with a molecular weight of approximately 1,700 and of the formula:

$$CH_2{=}CH{-}CH_2{-}\left(O{-}CH_2{-}\underset{\underset{CH_3}{|}}{CH}\right)_y{-}(O{-}CH_2{-}CH_2)_y{-}OC_4H_9$$

in which 75% of the chains are derived from propylene oxide.

The pressure was slowly raised to 18 kg./cm.$^2$ and the temperature to 220° C. This pressure was maintained constant while the water was eliminated from the reaction mixture by distillation.

The pressure was then decreased progressivly to atmospheric pressure in approximately 90 minutes, while the temperature increased to 280° C. The reaction mixture was kept under these conditions for one hour.

Microscopic examination of the compound obtained according to this process showed that the polyolefin phase was finely and evenly dispersed in the polyamide, under the form of inclusions with a diameter in the order of 4 microns.

This preparation was extruded in the form of a reed which was cooled and then cut up into grains. The grains were melted and extruded in a conventional melt spinning apparatus, then they were drawn without any oiling, so that it was possible to measure the intrinsic antistatic properties of the yarn.

The drawn yarns had a count of 78 dtex. for 23 filaments.

A control yarn was prepared with hexamethylene diamine polyadipate which was not modified. This control yarn and the yarn made from the compound obtained according to the example above were knitted with the same texture and tested from the point of view of soil resistance, after degreasing, in the following manner:

Hydrophilic testing.—This consists in measuring the time of diffusion of a measured drop of distilled water on knitted fabric presented in identical manner.

This test is defined in the Technical Manual of the American Association of Textile Chemists and Colourists (1966—volume 42, page B151) "Wettability evaluation" Standard test method AATCC 39, 1952.

Greying test.—Two comparable samples are treated successively in the Lauderometer (V=1/50) in distilled water for 30 minutes at 60°, in the presence of 30 metal marbles having a diameter of 6 mm., with a flanelette sample (having the same weight as the sample to be treated) which has been soiled with a mixture containing tallow, paraffin oil, carbon black and trichloroethylene. The condition of the samples is compared after 1 hour hour of treatment.

Oleophobia test.—This consists in depositing an oil film on the knitted fabrics, which are then agitated in distilled water: the facility with which the oil is removed from the knit is noted.

The results of these tests are shown in the following table:

TABLE I

| Example | Hydrophilia test with drop Standard AATCC | Greying test | Oleophobia test |
|---|---|---|---|
| 1 | Instantaneous | Average | Low oil elimination. |
| Control | 2 seconds | Strong | No elimination of oil. |

Various preparations according to the present invention were prepared under the same conditions as those described above except that the olefin monomer was one with a molecular weight of approximately 600 and with the formula:

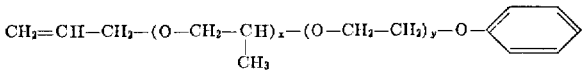

in which 50% of the chains are derived from propylene oxide.

The polycondensation, spinning and drawing were effected under operating conditions identical to those of Example 1.

EXAMPLES 3 AND 4

A compound was prepared from the same components as in Example 1, but an ethylene comonomer (Example 3) and a free radical polymerization catalyst (Example 4) were introduced into the reaction mixture.

The polycondensation, spinning and drawing were effected under operating conditions identical to those of Example 1.

A control yarn was prepared from hexamethylene diamine polyadipate under the same conditions.

The antistaticity of the yarns obtained in Examples 1, 2, 3, and 4 was evaluated with respect to that of the control yarn, by friction electrification under given conditions, i.e., in controlled atmosphere, on Rotschild's Static Voltmeter R 1019, and the average of ten measurements was noted.

Table II shows the measurements taken in these examples.

The abbreviations used have the following meaning:

VR=Relative viscosity
VF=Melted viscosity in poises
GT COOH=COOH groups
GT $NH_2$=$NH_2$ groups
PR (° C.)=Softening point
HR=Relative humidity rate of the atmosphere in which the tests are made

TABLE II

| | Ethylene monomers—5% in weight with respect to polyamide | Characteristics of the polymer preparation | | | | | Characteristic of the yarns | | Friction electrification in volts HR=50% |
|---|---|---|---|---|---|---|---|---|---|
| | | VR | VF | GT COOH | GT $NH_2$ | PR(° C.) | Tenacity g./tex. | Elongation | |
| Examples | | | | | | | | | |
| 1 | $CH_2=CH-CH_2-(O-CH_2-\underset{\underset{CH_3}{\vert}}{CH})_x-(OCH_2-CH_2)_y-O-C_4H_9$ | 32.8 | 1,600 | 78 | 46 | 265 | 46.8 | 24.2 | 30 |
| 2 | $CH_2=CH-CH_2-(O-CH_2-\underset{\underset{CH_3}{\vert}}{CH})_x-(O-CH_2-CH_2)_y-O-$ 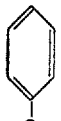 | 26.7 | 810 | 76 | 42 | 264.6 | 31.5 | 30.2 | 25 |
| 3 | Monomer of Example 1 plus 25% in weight of styrene with respect to monomer Example 1 | 37.4 | 1,650 | 63 | 44 | | | | 30 |
| 4 | Monomer of Example 1 plus 1% in weight of dicumyl peroxide with respect to monomer Example 1 | 32.5 | 1,630 | 43 | 80 | | | | 8 |
| Control | | 35.5 | | 72 | 44 | | 39.8 | 27.7 | 300 |

EXAMPLE 5

An interchange balloon-flask was loaed with 3,298 g. of dimethyl terephthalate, 2,266 g. of ethylene glycol, and 1,521 g. of manganese acetate.

The interchange was effected and 2,540 g. of hypophosphorous acid were added to the reaction mixture.

The polycondensation was then effected in an autoclave of 7.5 l. in the presence of 1,320 g. of antimony oxide. The excess glycol was eliminated progressively by distillation under vacuum; 163.2 g. (i.e., 5% by weight with respect to the polyester) of the folowing olefin monomer were then added, through the intermediary of a lock-chamber:

$$CH_2=CH-CH_2-(O-CH_2-\underset{\underset{CH_3}{\vert}}{CH})_x-(OCH_2-CH_2)_y-OC_4H_9$$

in which 75% of the chains were derived from propylene oxide.

The reaction was continued for 2½ hours at 285° C. under a pressure of 0.3 mm. Hg.

Microscope examination of the resulting compound showed that the polyolefin phase was finely and evenly dispersed in the polyester in the form of inclusions with a diameter in the order of 3 microns.

Iodometric analysis of the remaining double links shows that 55±5% of the double links had disappeared.

This composition was extruded in the form of a reed which was cooled, then cut up in grains. The grains were melted and extruded in a conventional melt spinning apparatus, then drawn without using any oiling, so that it was possible to measure the intrinsic antistatic properties of the yarn.

The drawn yarns had a count of 78 dtex. for 23 filaments.

A control yarns sample was made from polyethylene terephthalate under the same conditions.

The results of these measurements are shown in Table III.

EXAMPLE 6

A polyolefin is prepared by loading in a glass reactor 100 g. of $CH_2=CH-CH_2-(O-CH_2-CH_2)_n-OH$, of a molecular weight of approximately 600, and 2 g. of dicumyl peroxide as a catalyst.

The reaction mixture was kept this way for 3 hours, then it was cooled and the amount of double links which remained by bromometry checked by coulometry evaluated: 80% of the ethylene functions had disappeared.

The average molecular weight was 10,000.

A 7.5 l. autoclave, first cleaned by a flow of nitrogen, was then loaded with 5,240 g. of aqueous solution 50% in weight of hexamethylene diammonium adipate, 4.5 g. of acetic acid as viscosity stabilizer, and 113 g. (i.e., 5% by weight) of the polyolefin obtained according to the process described above.

The polycondensation was effected under the same conditions as in Example 1.

The resulting polymer was extruded in the form of a continuous reed, which was cooled and granulated.

The grains obtained were melted and extruded in a conventional melt-spinning apparatus.

The drawn yarns had a count of 78 dtex. for 23 filaments.

The same measurements as in the preceding examples were taken with respect to antistaticity. Table IV shows the results obtained.

The control yarn was made from non-modified hexamethylene diamine polyadipate.

TABLE III

| Example | Characteristics of the polymer VR | VF | PR (° C.) | Electrification by friction HR=35% | Hydrophilia test by drop AATCC | Greying test | Oleophobia test | Moisture retention, percent in weight HR=67% |
|---|---|---|---|---|---|---|---|---|
| 5 | 83 | 2,540 | 260 | 350 | >10 minutes but penetration slightly faster | High | Low elimination | 0.75 |
| Control | | | | 630 | >10 minutes | Very high | No elimination | 0.29 |

TABLE IV

| Example | Characteristics of the polymer compound VR | VF | GT COOH | GT $NH_2$ | PR (° C.) | Characteristics of yarns Tenacity in g./tex. | Elongation percent | Electrification upon friction in volts HR=48% | Moisture pick up in percent in weight HR=65 |
|---|---|---|---|---|---|---|---|---|---|
| 6 | 31.1 | 1,340 | 78 | 43 | 265.3 | 42.6 | 25 | 3,600 | 5.3 |
| Control | | | | | | | | >>5,000 | 3.9 |

EXAMPLE 7

A polyolefin identical to that described in Example 6 was prepared.

This polymer was inserted in melted hexamethylene diamine polyadipate, at the rate of 3.5% by weight with respect to the polyamide.

The resulting preparation was spun and drawn under conditions identical to those described in the preceding examples.

A control yarn was prepared with hexamethylene diamine polyadipate.

The samples were charged to a potential of 100 volts by static induction.

The duration of half and of three quarters discharge in the air was measured, at a temperature equal to 22° C.

The results obtained are shown in Table V.

TABLE V

| Example | HR in percent | Duration of half discharge in seconds | Duration of three quarters discharge in seconds |
|---|---|---|---|
| 7 | 46 | 5.7 | 13.2 |
| | 66 | 0.83 | 1 |
| Control | 46 | 107 | 349 |
| | 66 | 11 | 26 |

The foregoing examples clearly illustrate the advantages of the novel antistatic and anti-soiling composition of the present invention based upon a thermoplastic polymer selected from linear polyamides and polyesters. In this regard the foregoing examples clearly illustrate that by incorporating within the polyamide or polyester composition from about 1 percent to about 10 percent by weight based on the weight of the total composition of a polyolefin having an average molecular weight of higher than 1000 and having pendant antistatic groupings as previously set forth, the antistatic and anti-soiling characteristics of the polyamide or polyester are improved. In this regard, such improvement is seen whether the polyolefin is prepared in suit through simultaneous polymerization and polycondensation or whether the polyolefin is preformed and added either to the polycondensation reaction or to the preformed base polymer.

It is obvious from the foregoing that certain objects and advantages of the present invention have been illustrated by way of the foregoing exemplification. It is to be understood, however, that such examples as set forth are for purposes of exemplification only and the present invention is not in any way to be deemed as limited thereto but rather, must be construed as broadly as all or any equivalents thereof.

I claim:

1. An antistatic and anti-soiling composition comprising a thermoplastic linear polyamide and from about 1 percent to about 10 percent by weight based on the weight of the total composition of a polyolefin having pendant polyoxyalkylene chains having an average molecular weight higher than 1000 and consisting essentially of the repeating structural unit of the formula:

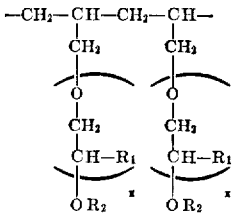

wherein $R_1$ is selected from hydrogen and methyl; $R_2$ is selected from hydrogen, alkly and aryl; and x is an integer of 1 to 600.

2. The composition of claim 1 wherein said polyolefin is present as finely dispersed inclusions having an average diameter of from 1 to 10 microns.

3. The composition of claim 1 wherein said polyolefin is present in an amount of 2 to 5 percent by weight based on the weight of the total composition.

4. The composition of claim 1 wherein said polyolefin is prepared in situ during the polycondensation reaction in the preparation of said polyamide through the simultaneous polymerization of a monomer of the formula:

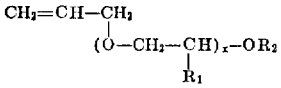

wherein $R_1$ is selected from hydrogen and methyl; $R_2$ is selected from hydrogen, alkyl and aryl; and x is an integer of 1 to 600.

5. The composition of claim 1 wherein said composition is in the form of fibers.

References Cited

The following references, cited by the Examiner, are of record in the patented file of this patent or the original patent.

UNITED STATES PATENTS

| | | | |
|---|---|---|---|
| 3,431,227 | 3/1969 | Kastning | 260—857 |
| 3,475,898 | 11/1969 | Magat et al. | 260—857 |
| 3,522,329 | 7/1970 | Okazaki | 260—857 |
| 3,549,724 | 12/1970 | Okazaki | 260—857 |

PAUL LIEBERMAN, Primary Examiner

U.S. Cl. X.R.

260—91.1 R, 91.1 S, 91.3 R, 873